(12) United States Patent
Drummond

(10) Patent No.: US 7,274,856 B2
(45) Date of Patent: Sep. 25, 2007

(54) WAVEGUIDE APPARATUS AND METHOD FOR LASER WELDING

(75) Inventor: James Paul Drummond, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 120 days.

(21) Appl. No.: 10/883,308

(22) Filed: Jun. 30, 2004

(65) Prior Publication Data

US 2006/0034580 A1 Feb. 16, 2006

(51) Int. Cl.
*G02B 6/00* (2006.01)
*B41J 2/14* (2006.01)
*B41J 2/16* (2006.01)

(52) U.S. Cl. .................. 385/147; 347/47; 347/48; 347/49; 347/86

(58) Field of Classification Search ........... 347/47–49, 347/86
See application file for complete search history.

(56) References Cited

U.S. PATENT DOCUMENTS

| | | | |
|---|---|---|---|
| 5,808,641 A * | 9/1998 | Miyagawa et al. | 347/65 |
| 6,329,629 B1 | 12/2001 | Grewell | |
| 6,528,755 B2 | 3/2003 | Grewell et al. | |
| 2003/0095418 A1* | 5/2003 | Dalton et al. | 362/582 |

* cited by examiner

*Primary Examiner*—Frank G. Font
*Assistant Examiner*—Erin D Chiem
(74) *Attorney, Agent, or Firm*—King & Schickli, PLLC

(57) ABSTRACT

Some embodiments of the present invention provide a waveguide apparatus for transferring light to a weld area. The waveguide apparatus can include a waveguide comprising a material having a first index of refraction and having at least one wall defining at least one cavity. The assembly can also include a filler material positioned within the at least one cavity and having a second index of refraction less than the first index of refraction. Also, some embodiments of the present invention provide a laser welding assembly in which a waveguide apparatus is used to weld materials, a method of laser welding materials using a waveguide, and a method of manufacturing such a waveguide.

14 Claims, 6 Drawing Sheets

WAVEGUIDE APPARATUS AND METHOD FOR LASER WELDING

BACKGROUND OF THE INVENTION

The present invention generally relates to laser welding and in some embodiments, to a laser welding assembly having a waveguide apparatus.

Laser transmission welding is a relatively new processing technique for joining elements made of various materials. For example, laser transmission welding can be used to join plastic elements. In many cases, it is necessary for one of the two materials being joined to be substantially transparent or at least partially transparent to the light produced by the welding laser. The second material must be able to absorb the laser energy and heat up, thereby melting the surrounding material. Therefore, the second material is often opaque or at least transmits less light than the first material. Also, in many cases the pieces of material to be joined must be in contact with each other such that when the second material absorbs the laser energy, heat can be transferred to both materials, resulting in the melting and joining of the two materials. The infrared transmission rate of the top material is important in the transmission laser welding process. If the transmission rate is too low, the energy absorbed in the first material can overheat and degrade the first material before the laser energy is transmitted to the second material.

SUMMARY OF THE INVENTION

Some existing laser welding assemblies include one or more waveguides to distribute light across a weld area as well as to apply pressure to the weld area during the welding process. As weld areas become smaller, the waveguides typically have finer features (e.g., smaller wave guide wall sizes and thicknesses). As such features of the waveguides become finer, they also become more delicate and more susceptible to damage, such as when applying pressure to the workpiece with the waveguide. During the application of pressure, the waveguide is often in contact with the parts being welded. Repeated contact cycles can damage the waveguide.

In some embodiments, the present invention provides a waveguide apparatus including one or more cavities at least partially filled with a material to increase durability of the waveguide apparatus. The cavities can be at least partially filled with a material having a smaller index of refraction than the index of refraction of the material forming the waveguide.

In some embodiments, the present invention provides a waveguide apparatus for transferring light to a weld area. The waveguide apparatus includes a waveguide having a wall through which light can pass. The wall at least partially defines a cavity and includes a material having a first index of refraction. The waveguide apparatus also includes a filler material located within the cavity. The filler material has a second index of refraction, which is less than the first index of refraction.

Some embodiments of the present invention provide a laser welding assembly for welding a first material of an apparatus to a second material of the apparatus. The laser welding assembly includes a laser source for producing a light beam operable to heat at least a portion of a weld area of the apparatus and a waveguide apparatus positioned to transfer the light beam to the weld area. The waveguide apparatus includes a waveguide having at least one wall at least partially defining at least one cavity. The waveguide includes a material having a first index of refraction. The waveguide apparatus also includes a filler material located within the at least one cavity. The filler material has a second index of refraction, which is less than the first index of refraction.

In some embodiments, the present invention provides a method of laser welding a first material of an apparatus to a second material of the apparatus. The method includes positioning a waveguide in a path of light from a laser, passing light into a wall of the waveguide having a first index of refraction, guiding light within the wall by reflecting light against a filler material of the waveguide adjacent to the wall, transmitting light from the wall to the weld area and heating at least one of the first and second materials with light from the waveguide to join the first and second materials.

Some embodiments of the present invention provide a method of manufacturing a waveguide apparatus for laser welding a first material of an apparatus to a second material of the apparatus. The method includes forming a waveguide from a first material having a first index of refraction, forming at least one wall which is positioned to transmit light through the waveguide, defining a cavity within the waveguide adjacent to the at least one wall, and at least partially filling the cavity of the waveguide with a second material having a second index of refraction, which is less than the first index of refraction.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings.

Figure 1:
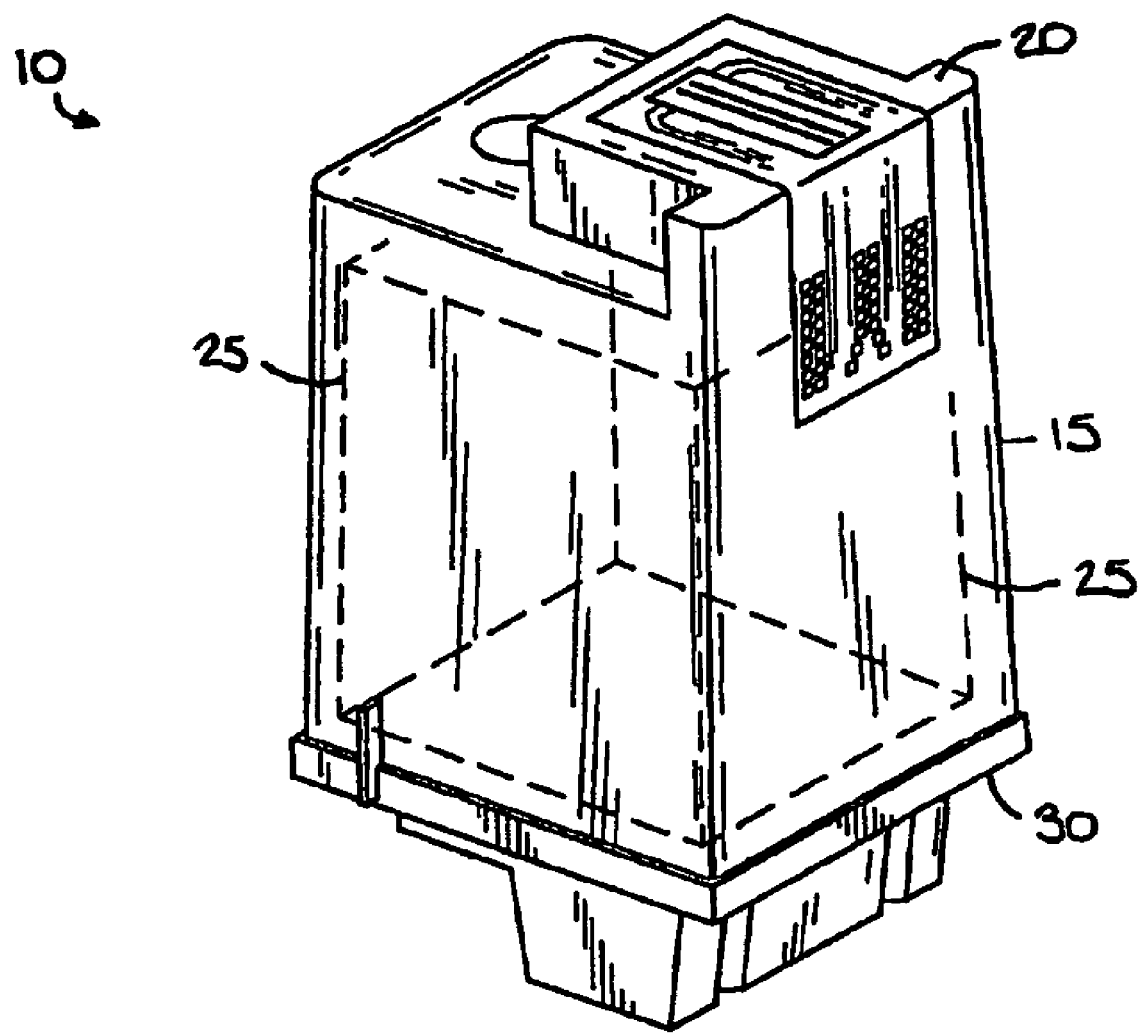
FIG. 1 is a perspective view of an inkjet printhead.
Figure 3:
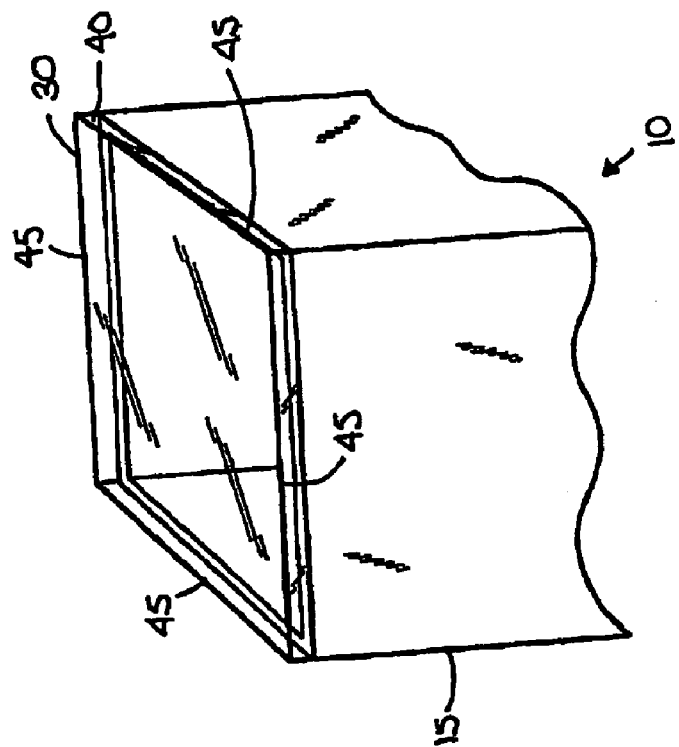
FIG. 3 is a perspective view of a portion of an inkjet printhead, such as the inkjet printhead shown in FIG. 1.
Figure 2:
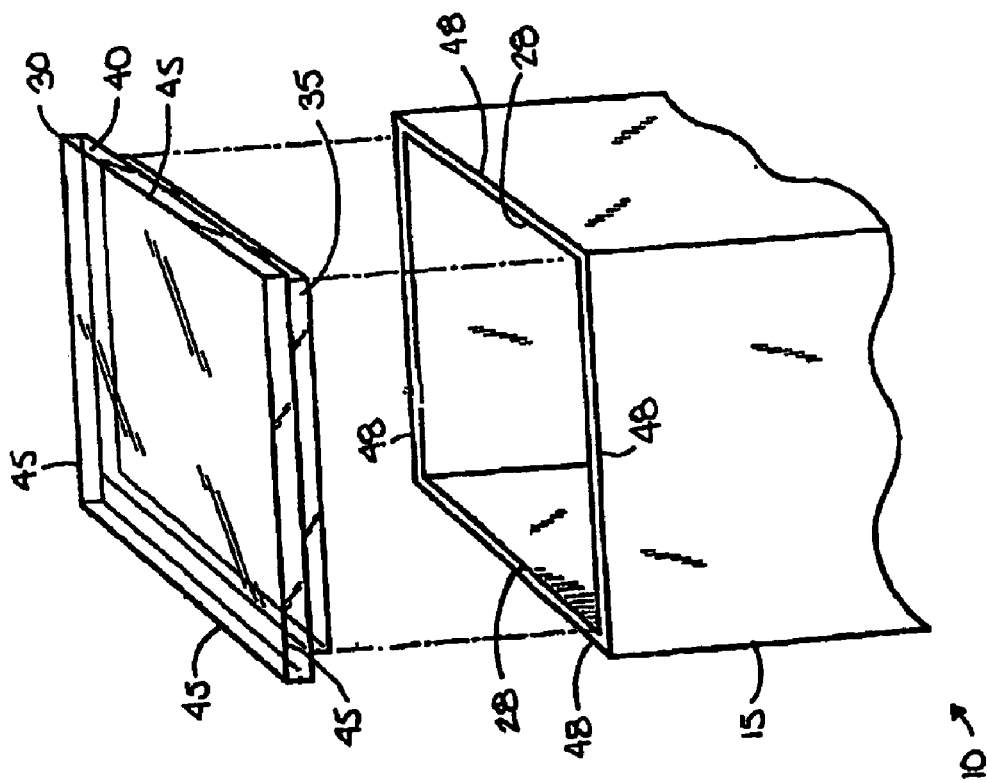
FIG. 2 is an exploded perspective view of a portion of an inkjet printhead, such as the inkjet printhead shown in FIG. 1.
Figure 4:
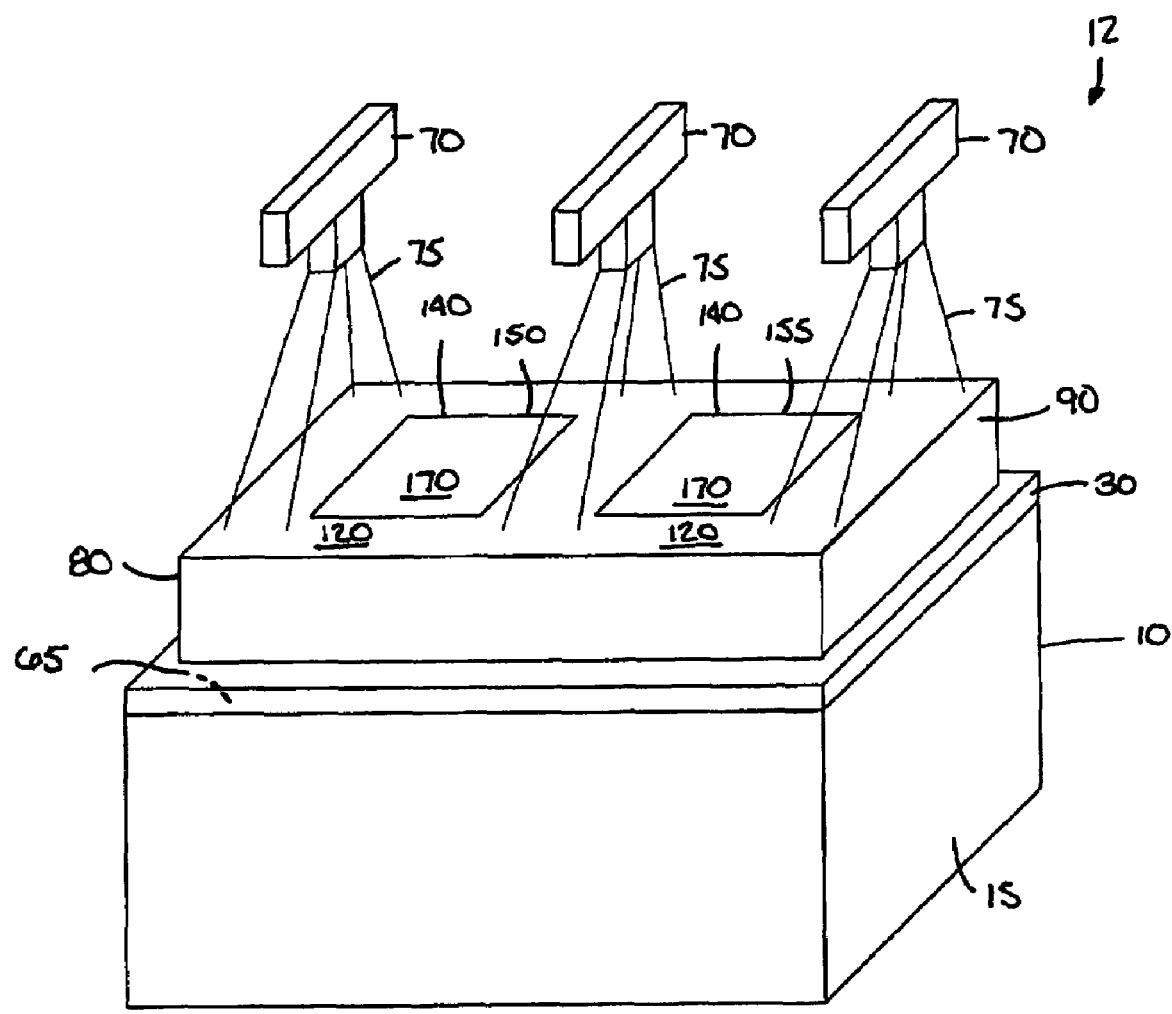
FIG. 4 is a perspective view of a laser welding assembly according to an embodiment of the present invention.

FIGS. 1-3 illustrate at least a portion of an inkjet printhead 10 which can be assembled using a laser welding assembly 12 (one example of which is illustrated in FIG. 4) embodying the present invention. The laser welding assembly 12 illustrated in FIG. 4 can be used to weld an apparatus, such as the exemplary inkjet printhead 10 of FIGS. 1-3. Although the various embodiments of the present invention are described herein with reference to welding a housing and lid of an inkjet printhead 10, it will be appreciated that the present invention can be used to weld any other parts of any other type of printing apparatus, including without limitation parts of a toner cartridge. In further embodiments, the laser welding assembly 12 can be used to weld various parts of other apparatuses. The following description is therefore with reference to welding inkjet printheads 10 by way of example only.

In some embodiments of the present invention, one part of the elements to be welded comprises a material having a greater degree of light transmissivity than that of a part to which it is to be welded. For example, in some embodiments one part is transparent or semi-transparent, permitting at least part of the light from a laser to pass therethrough to another part which is less transparent (e.g., semi-opaque or substantially opaque). As will now be described with reference to FIGS. 2 and 3, one part of each illustrated inkjet printhead 10 comprises a substantially transparent material and another part comprises a substantially energy-absorbing material.

As shown in FIGS. 1-3, the exemplary printhead 10 includes a housing or body 15 that defines a nosepiece 20 and at least partially defines an ink reservoir 25. The body 15 further defines an opening 28, as shown in FIG. 2.

The body 15 can be constructed of a variety of energy-absorbing materials including, without limitation, at least one of polymers, metals, ceramics, composites and the like. In some embodiments, the body 15 can be constructed of a polyphenylene ether-polystyrene (PPE-PS) resin. Still other materials capable of absorbing energy (e.g., from a laser beam as described below) are possible, and fall within the spirit and scope of the present invention. As described above, in some embodiments such materials have lower light transmissivity than the part(s) to which they will be welded, and can be opaque and semi-opaque if desired.

Still referring to the illustrated embodiments of FIGS. 2 and 3, the printhead 10 further includes a lid 30 welded to the body 15 to cover the ink reservoir 25. When the lid 30 is welded to the housing 12, the lid 30 and housing 15 form a seal to prevent leakage of ink from the ink reservoir 25. In the illustrated embodiments of FIGS. 2 and 3, the body 15 of the printhead 10 is constructed from an energy-absorbing material, and the lid 30 of the printhead 10 is constructed from a material having higher light transmissivity (e.g., a substantially transparent or translucent material).

In the illustrated embodiments of FIGS. 2 and 3, the lid 30 includes a first portion 40 having a perimeter 45 approximately the same size as the perimeter 48 (shown in FIG. 2) of the printhead body 15. At least a portion of the lid 30, such as, for example, an area of the first portion 40, comprises a material that is at least partially (and in some cases, generally) transparent or translucent with respect to laser light. In the illustrated embodiments of FIGS. 2 and 3, the entire first portion 40 of the lid 30 is constructed of a generally optically transparent or translucent material.

In the embodiment of FIG. 2, the lid 30 can also include a second portion 35 that substantially fits within the opening 28 defined by the printhead body 15. In this illustrated embodiment of FIG. 2, the second portion 35 is coupled to the first portion 40, and can be integral therewith. In some embodiments, (e.g., the embodiment illustrated in FIG. 3), the lid 30 may not include the second portion 35. In other embodiments, the second portion 35 of the lid 35 can also be constructed of the same material as the first portion 40, such as a generally optically transparent or translucent material as described above.

FIG. 4 illustrates an exemplary laser welding assembly 12 for heating a weld area of an apparatus, such as the printhead 10 described above. As shown in FIG. 4, the laser welding assembly 12 can weld a joint or weld area 65 of the printhead 10. The laser welding assembly 12 includes at least one laser source 70 producing a beam of light 75. Although the laser source 70 can be selected to produce any laser light wavelength, the laser sources 70 illustrated in FIG. 4 produce infrared light 75. In some embodiments, such as the embodiment shown in FIG. 4, the laser welding assembly 12 can include a plurality of laser sources 70, each producing a beam of light 75. The laser source 70 can include one or more light-emitting diodes (LEDs) capable of emitting light. The laser welding assembly 12 can include other laser sources as is well known in the art.

The laser welding assembly 12 illustrated in FIG. 4 also includes a waveguide apparatus 80 according to an embodiment of the present invention. Another example of a waveguide apparatus 80 according to an embodiment of the present invention is shown in FIGS. 5 and 6.

Figure 5:
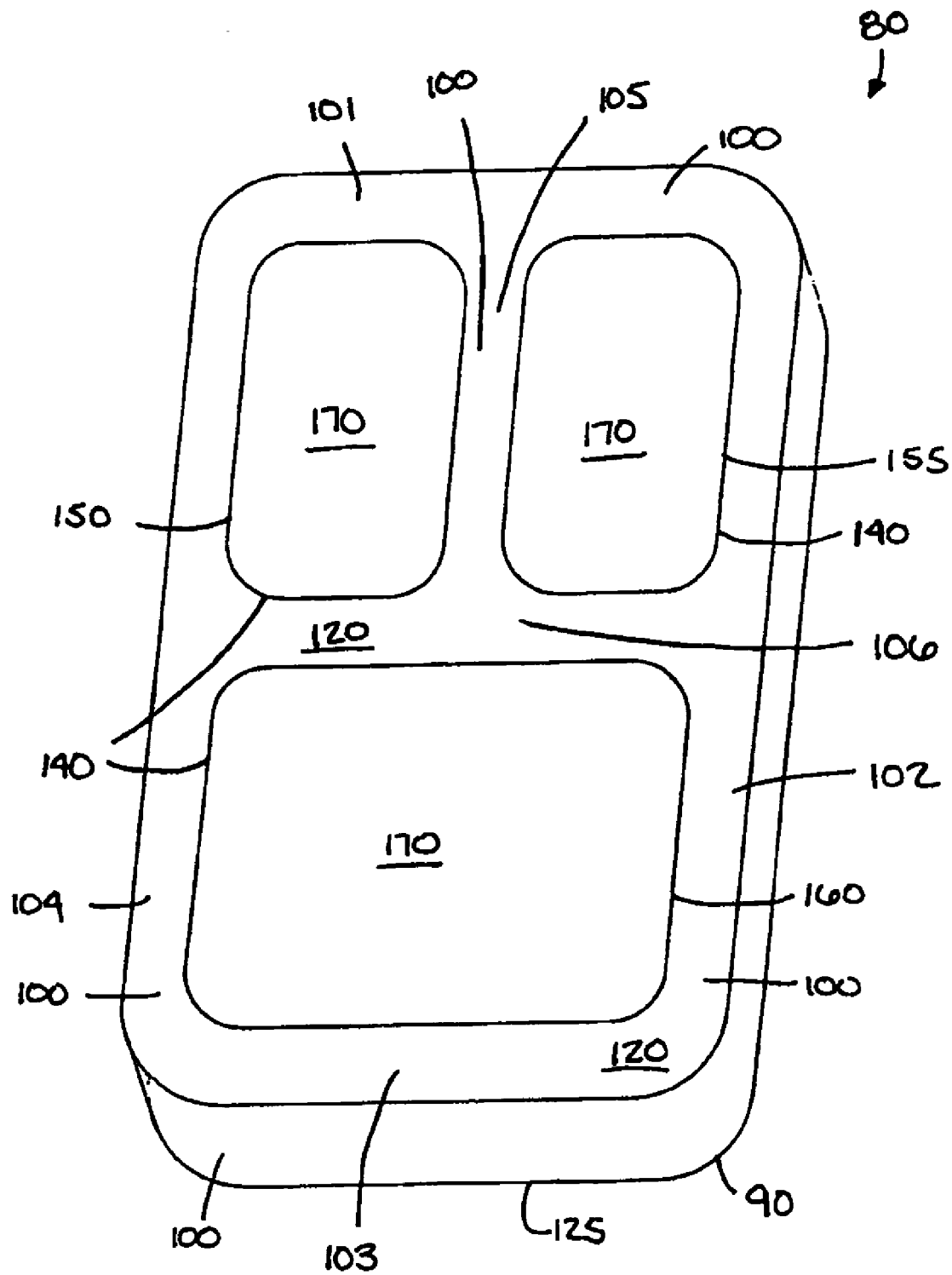
FIG. 5 is a perspective view of a waveguide apparatus for use in a laser welding assembly, such as the laser welding assembly of FIG. 4.
Figure 6:
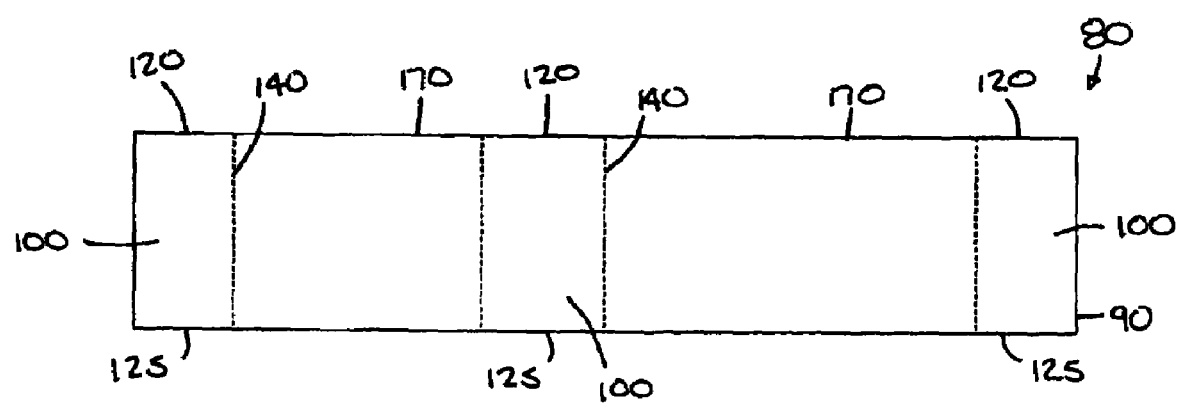
FIG. 6 is a side view of a waveguide apparatus for use in a laser welding assembly, such as the laser welding assembly of FIG. 5.

As shown in FIGS. 4-6, the waveguide apparatuses 80 each include a frame 90 (referred to hereinafter as the "waveguide") suitable for transmitting the beam of light 75 (e.g., infrared or near-infrared light) produced from the one or more laser sources 70. In some embodiments, the waveguide 90 is constructed to distribute light 75 across at least a portion of a weld area of an apparatus, such as the weld area 65 of the printhead 10 illustrated in FIG. 4. In some embodiments, such as the embodiment illustrated in FIG. 4, the waveguide 90 is constructed to distribute light 75 across multiple weld areas 65, or to distribute light 75 across the entire weld area 65. Accordingly, in the illustrated embodiments of FIGS. 4-6, the waveguide 90 outlines the weld area 65 of the printhead 10. In other embodiments, the waveguide 90 can outline a portion of the weld area 65 instead of the entire weld area as shown in FIG. 4.

In some embodiments, the waveguide 90 is positioned adjacent to a weld area 65 and distributes the light 75 across a portion of the weld area 65 or across the entire weld area 65 with little or no contact between the waveguide 90 and the parts being welded. In other embodiments, the waveguide 90 contacts an element having a surface of the weld area 65, and can apply pressure to the weld area 65 during the welding process.

In some embodiments, the waveguide 90 comprises a transparent material, such as, for example, polycarbonate, polyetherimide, polysulfone, styrene, glasses, doped glasses, and any combination thereof, and has a relatively high index of refraction ($n_1$). In the illustrated embodiments, for example, the waveguide 90 comprises polycarbonate material having an index of refraction ($n_1$) of approximately 1.59.

In the illustrated embodiments of FIGS. 4-6, the waveguide 90 is substantially rectangular and includes a plurality of walls 100. However, in other embodiments, the waveguide 90 can have any other shape desired, and can include any number of walls 100 arranged in any manner. The waveguide 90 shown in FIG. 5 includes a first wall 101, a second wall 102, a third wall 103, a fourth wall 104, a fifth wall 105 and a sixth wall 106. In the embodiment of FIG. 5, the plurality of walls 100 are integral with the rest of the waveguide 90 and with each other. In other embodiments, the waveguide 90 can include more or fewer walls 100 than shown and described, outlining a variety of weld areas having different shapes and sizes. Also, in other embodiments, the walls 100 can be separate from one another or can be coupled to one another in any suitable manner.

The walls 100 can have any shape, length, width, and thickness desired. For example, the walls 100 in the embodiments of FIGS. 4-6 are relatively long and straight, short in width (resulting in a relatively thin waveguide apparatus 80), and relatively thin. In other embodiments, longer or shorter walls having any other cross-sectional width and thickness can be used. For example, one or more of the walls can be post-shaped, or can be elongated to extend across any portion of the waveguide apparatus 100.

Still referring to FIGS. 4-6, each of the plurality of walls 100 includes a first surface 120 and a second surface 125 substantially parallel to the first surface 120. In the illustrated embodiments, the first surfaces 120 of each wall 101, 102, 103, 104, 105 and 106 are integral with each other, and the second surfaces 125 of each wall 101, 102, 103, 104, 105 and 106 are also integral with each other.

As shown in FIGS. 4-6, the plurality of walls 100 at least partially define at least one cavity 140. In the embodiment of FIG. 4, the waveguide 90 at least partially defines a first cavity 150 and a second cavity 155. In the embodiment of FIG. 5, the waveguide 90 at least partially defines a first cavity 150, a second cavity 155 and a third cavity 160. In the illustrated embodiments, the cavities 140 are defined at least in part by the shape of the weld area 65.

The waveguide apparatus 80 illustrated in FIGS. 4-6 also includes a filler 170 located in at least one of the cavities 140. In the embodiments of FIGS. 4-6, a filler 170 is located within each of the cavities 140 defined by the waveguide 90. The filler 170 can comprise a material having a second index of refraction ($n_2$) that is less than the index of refraction ($n_1$) of the waveguide 90. In some embodiments, the filler 170 comprises a relatively low index of refraction material, such as, for example, acrylic, epoxy, urethane, florinated compounds, silicone based materials with low refractive indices, other low refractive index materials, combinations of such materials, or the like. In some embodiments, the filler 170 is a solid or liquid material. However, in other embodiments, the filler 170 can be one or more gases sealed within the cavities 140 (e.g., such as by walls covering the open ends of the cavities 140 at the first and second surfaces 120, 125). The use of a solid filler material can provide support, stiffening, and/or strengthening benefits for the waveguide 90 as described below, and in some embodiments the filler 170 can be retained in the walls 100 described above without the need for additional walls or other waveguide assembly structure.

Any number of the cavities 140 can have filler material therein. Also, the cavities need not necessarily be filled with filler 170, and can be only partially filled with such material. Filler 170 can occupy any amount of each cavity 140, and can be located adjacent to and/or in contact with any of the walls 100 adjacent to the cavity 140. Depending at least in part upon the position of filler 170 within a cavity 140, the filler 170 can help to support or stiffen one or more walls 100 of the waveguide 90, resulting in a stronger waveguide apparatus 80 that is more resistant to damage. In some embodiments, the filler 170 partially, substantially, or entirely fills one or more of the cavities 140 of the waveguide assembly 80.

Figure 7:
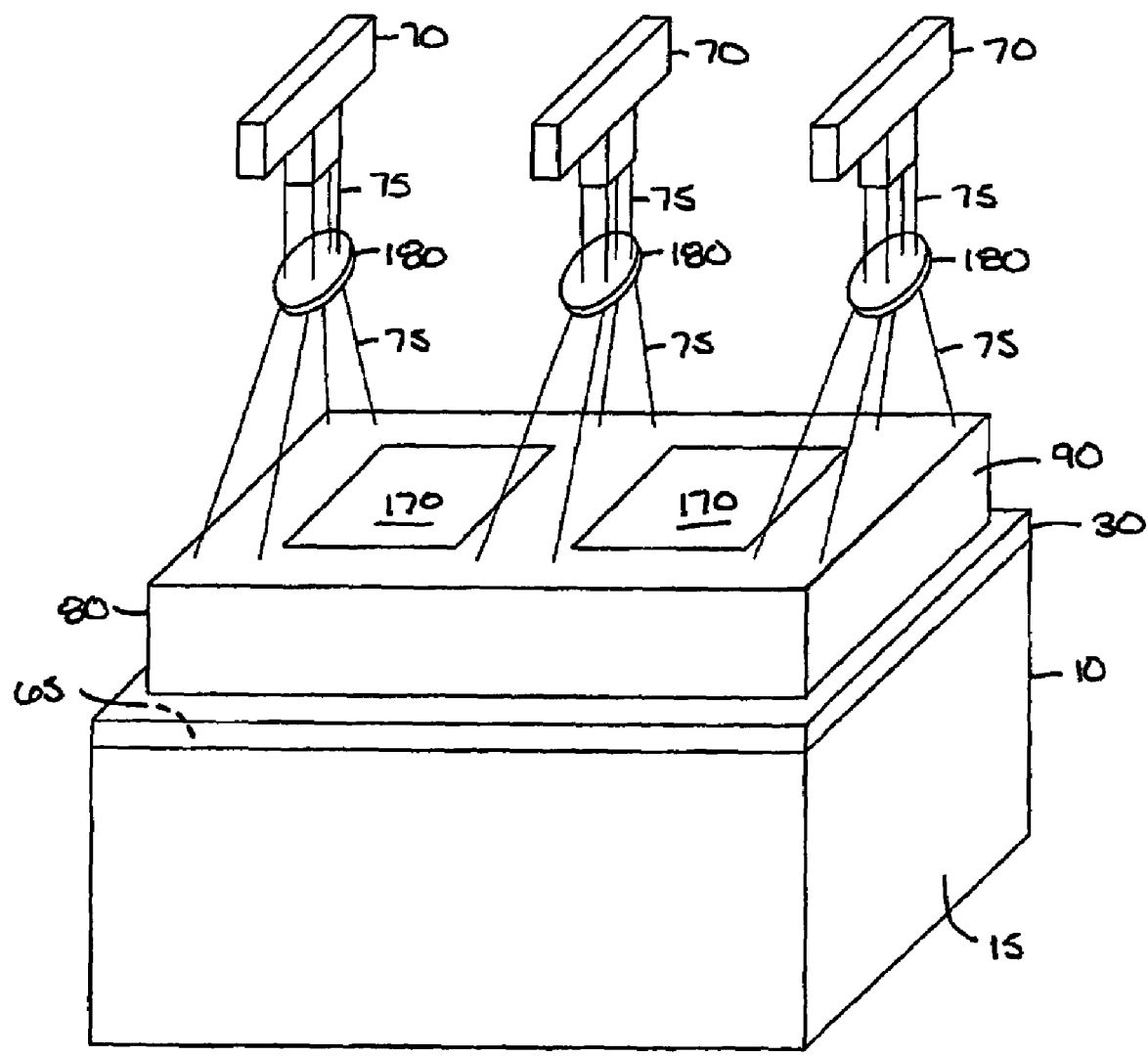
FIG. 7 is a perspective view of another laser welding assembly according to an embodiment of the present invention.

In some embodiments, such as the embodiment illustrated in FIG. 7, the laser welding assembly 12 can include one or more manipulating elements 180 that can manipulate (e.g., control, focus, redirect, converge, diverge, split, scatter and the like, for example) beams of light 75 from the laser sources 70. The manipulating elements 180 can include, for example, one or more lenses, one or more fiber optic cables, one or more additional waveguides, one or more mirrors, one or more masks, and the like, or a combination of these and/or similar elements. In the embodiment shown in FIG. 7, the manipulating elements 180 include a plurality of lenses that can focus light from the laser source 75 to the waveguide apparatus 80.

In some embodiments, the filler 170 can be cast or molded into the cavities 140 in the waveguide walls 100. Such material can allow for the same total internal reflection phenomena to occur, but can also make at least part of the waveguide 90 solid and more durable. Composite waveguides can be polished to create a good light-coupling surface through which the waveguide 90 can receive light. Also, such waveguides 90 can have a relatively flat working surface facing the workpiece to be welded. Finished waveguides apparatuses 80 made as described above work well for guiding laser light.

According to some embodiments of the invention, a polycarbonate waveguide 90, illustrated in FIG. 4, (($n_1$) ~1.59) is fabricated to deliver light to a desired pattern on the welding surface or area 65 of an apparatus (e.g., the printhead 10). The walls 100 of the waveguide 90 are approximately 1 mm thick at the second surface 125 and can be shaped to mate or engage a body to be welded. For example, the walls 100 of the waveguide 90 illustrated in FIG. 4 are shaped to mate with the body 15 and lid 30 of a printhead 10 to be welded. The waveguide 90 is backfilled with a castable acrylic material (($n_2$)~1.49) to form a filler 170 in each cavity 140. Therefore, the difference ($\Delta n$) of the indices of refraction between the walls 100 of the waveguide 90 and the filler 170 is approximately 0.1. The difference ($\Delta n$) of 0.01 is sufficient for the light 75 to be contained within the first material (e.g., the polycarbonate material) of the waveguide 90 based on the principle of total internal reflection. In other embodiments, a difference ($\Delta n$) of approximately 0.01 or lower are still suitable to enable light 75 to be contained within the waveguide 90. However, smaller difference ($\Delta n$) can result in a loss of light, and/or a reduced area illuminated by light from the waveguide 90.

In some embodiments of the present invention, the waveguide apparatus 80 is positioned adjacent to the weld area 65 of the inkjet printhead 10 (e.g., over the weld area 65 in some orientations of the waveguide apparatus 80 and inkjet print head 10) prior to welding. In some embodiments, such as the embodiments shown in FIGS. 4 and 7, the second surface 125 of the waveguide 90 can be positioned on a part to be welded, and can apply pressure to the weld area 65 during the welding cycle. Light 75 from the laser source 70 passes through the first surface 120 of the waveguide 90 and travels through the plurality of walls 100 due to the difference $\Delta n$ of the indices of refraction between the plurality of walls 100 and the filler 170. The light 75 exits the waveguide 90 through the second surface 125 of the waveguide 90 to the weld area 65. The light 75 heats the weld area 65 which in turn forms a weld joint in the inkjet printhead 10.

The waveguide 90 can manufactured in any manner, such as by injection molding or other types of molding, milling, casting, extruding, pressing, machining, and the like. For example, the waveguides 90 illustrated in FIGS. 4 and 5 are manufactured from a high index injection molding resin.

The cavities 140 can be provided with filler material in a number of different manners, such as by having fillers 170 inserted therein, by having fillers 170 injection molded or molded in any other manner into the cavities 140, by having fillers 170 cast in the cavities 140, and the like. In some embodiments, the fillers 170 can also be drawn into the cavities 140 under vacuum. In these embodiments, using a vacuum to draw the fillers 170 into the cavities 140 can reduce any bubble-forming gas out of the filler material. Gas within the filler material can degrade the performance of the waveguide. Furthermore, drawing fillers 170 under vacuum can also be used to fill very thin or small cavities 140.

In some embodiments, the waveguide 90 can be manufactured by injection molding. In these embodiments, for example, the fillers 170 can also be injection molded or can be cast into the cavities 140, such as, for example, by being drawn into the cavities 140 under vacuum. In further embodiments, the waveguide 90 can be milled, and the fillers 170 can be injection molded or cast into the cavities 140, such as, for example, by being drawn under vacuum.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A waveguide apparatus for transferring light to a weld area of to be welded parts, the waveguide apparatus, comprising:
   a waveguide not forming a portion of the to be welded parts having a wall through which light can pass, the wall at least partially defining a cavity and comprising a first material having a first index of refraction;
   and a filler material located within the cavity, the filler material having a second index of retraction, the second index of refraction being less than the first index of retraction and a difference between the first index of refraction and the second index of refraction is at least about 0.01.

2. A waveguide apparatus as set forth in claim 1, wherein the difference between the first index of refraction and the second index of refraction is less than unity.

3. A waveguide apparatus as set forth in claim 1, wherein the difference between the first index of retraction and the second index of retraction is about 0.1.

4. A waveguide apparatus as set for in claim 1, wherein the waveguide includes a plurality of walls.

5. A waveguide apparatus as set forth in claim 4, wherein the plurality of walls are coupled to define the cavity.

6. A waveguide apparatus as set forth in claim 4, wherein the plurality of walls are coupled to define a plurality of cavities, each cavity including filler material.

7. A waveguide apparatus as set forth in claim 4, wherein the plurality of walls are no greater than about 1 mm thick.

8. A waveguide apparatus as set forth in claim 1, wherein the first material includes at least one of polycarbonate, polyetherimide, polysulfone, styrene, and glass.

9. A waveguide apparatus as set forth in claim 8, wherein the filler material includes at least one of acrylic, epoxy, silicone, florinated compound and urethane.

10. A waveguide apparatus as set forth in claim 1, wherein the filler material includes at least one of acrylic, epoxy, silicone, florinated compound and urethane.

11. A waveguide apparatus as set forth in claim 1, wherein the first material is polycarbonate.

12. A waveguide apparatus as set forth in claim 1, wherein the filler material is epoxy.

13. A waveguide apparatus as set forth in claim 1, wherein the filler material is acrylic.

14. A waveguide apparatus as set forth in claim 1, wherein the cavity is substantially filled with the filler material.

* * * * *